United States Patent
Johnson et al.

(10) Patent No.: US 10,512,859 B2
(45) Date of Patent: Dec. 24, 2019

(54) HOUSING FOR FILTER ELEMENT; FILTER ELEMENT; METHODS OF USE AND MAKING

(71) Applicant: Donaldson Company, Inc., Minneapolis, MN (US)

(72) Inventors: Philip Edward Johnson, Apple Valley, MN (US); Jonathan G. Parsons, Lino Lakes, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 192 days.

(21) Appl. No.: 15/532,024

(22) PCT Filed: Dec. 16, 2015

(86) PCT No.: PCT/US2015/066161
§ 371 (c)(1),
(2) Date: May 31, 2017

(87) PCT Pub. No.: WO2016/100551
PCT Pub. Date: Jun. 23, 2016

(65) Prior Publication Data
US 2017/0266592 A1    Sep. 21, 2017

Related U.S. Application Data

(60) Provisional application No. 62/093,729, filed on Dec. 18, 2014.

(51) Int. Cl.
*B01D 53/02* (2006.01)
*B01D 29/33* (2006.01)
(Continued)

(52) U.S. Cl.
CPC .............. *B01D 29/33* (2013.01); *B01D 27/08* (2013.01); *B01D 29/31* (2013.01); *B01D 35/005* (2013.01);
(Continued)

(58) Field of Classification Search
CPC ........ B01D 2201/304; B01D 2201/306; B01D 2265/027; B01D 2265/029;
(Continued)

(56) References Cited

U.S. PATENT DOCUMENTS

| 5,066,391 A | 11/1991 | Faria |
| 5,548,893 A | 8/1996 | Koelfgen |
| 6,085,915 A | 7/2000 | Schwandt et al. |

FOREIGN PATENT DOCUMENTS

| EP | 0711196 A1 | 5/1996 |
| WO | 2004/033067 A2 | 4/2004 |

OTHER PUBLICATIONS

International Search Report and Written Opinion for PCT/US2015/066161, dated Mar. 9, 2016.

*Primary Examiner* — Christopher P Jones
(74) *Attorney, Agent, or Firm* — Merchant & Gould P.C.

(57) ABSTRACT

A filter assembly includes a filter head and filter cartridge. The filter cartridge includes a housing and element. The housing includes a can with an open mouth. An interface ring is secured to the can adjacent to the open mouth. The outer ring surface is against the inner wall of the can. The ring wall is angled between the first and second ends greater than one degree and less than 6 degrees. Methods of filtering and making the housing are provided.

19 Claims, 12 Drawing Sheets

(51) Int. Cl.
*B01D 46/00* (2006.01)
*B01D 46/24* (2006.01)
*B01D 27/08* (2006.01)
*B01D 29/31* (2006.01)
*B01D 35/00* (2006.01)

(52) U.S. Cl.
CPC ...... *B01D 46/0005* (2013.01); *B01D 46/2411* (2013.01); *B01D 2201/304* (2013.01); *B01D 2201/306* (2013.01); *B01D 2265/027* (2013.01); *B01D 2265/029* (2013.01); *B01D 2265/05* (2013.01); *B01D 2271/02* (2013.01); *B01D 2279/60* (2013.01)

(58) Field of Classification Search
CPC ............ B01D 2265/05; B01D 2271/02; B01D 2279/60; B01D 27/08; B01D 29/31; B01D 29/33; B01D 35/005; B01D 46/0005; B01D 46/2411
See application file for complete search history.

HOUSING FOR FILTER ELEMENT; FILTER ELEMENT; METHODS OF USE AND MAKING

This application is a National Stage application of PCT International Patent application No. PCT/US2015/066161, filed Dec. 16, 2015, which and claims priority to U.S. Provisional patent application Ser. No. 61/093,729, filed Dec. 18, 2014, which applications are incorporated herein by reference. To the extent appropriate, a claim of priority is made to each of the above disclosed applications.

TECHNICAL FIELD

This disclosure relates to filters. In particular, this disclosure relates to a filter having an interface ring secured to a housing of the filter and methods for making the filter.

BACKGROUND

Filters are needed for many different applications. For example, filters can be used on engines to purify liquid, such as fuel or oil. Filters can be used on engines for purifying air to be used in combustion. Filters can also be used on generators or various industrial applications. For example, filters can be used for various gases, including propane gas. In these and other applications, it is important that the filter does not have any leaks allowing the liquid or gas to escape.

Improvements in filter designs are desirable, in particular to prevent leaking.

SUMMARY

In accordance with principles of this disclosure, a housing for a filter element is provided. The housing includes a can having a wall surrounding an interior volume and an open mouth. The can wall has an inner wall surface in communication with the interior volume. An interface ring is secured to the can adjacent to the open mouth. The interface ring has a ring wall with first and second opposite ends, an outer ring surface, and an inner ring surface. The inner ring surface can be threaded, although other connection means are also contemplated. The outer ring surface is against the inner wall of the can. The ring wall is angled between the first and second ends greater than one degree and less than 6 degrees.

A seal member can be at the open mouth to form a seal with a filter head, and a filter head is secured to the housing.

The housing is seal member free between the interface ring and the can wall.

The interface ring will be self-supporting within the can.

The interface ring can have a beveled surface from the first end at the outer ring surface and extending to the inner ring surface.

The beveled surface can be at an angle of at least 40 degrees.

The beveled surface can be at an angle of no greater than 70 degrees.

In some implementations, the can has a section folded over the interface ring at the open mouth.

In some embodiments, the can has a section folded over and against the beveled surface.

Preferably, the can has no more than a single fold.

In preferred implementations, the can has a closed end opposite of the mouth.

In preferred embodiments, the can wall is shoulder-free at the second end of the ring wall.

In many implementations, the can wall will be completely shoulder-free.

The ring wall can be angled between the first and second ends less than 5 degrees.

The ring wall can be angled between the first and second ends at least 1.5 degrees.

The ring wall can be angled between the first and second ends less than 4 degrees.

The ring wall can be angled between the first and second ends between 1.5 degrees and 4 degrees.

The outer ring surface will be against the inner wall of the can and will be adhesive-free.

The interface ring will be secured to the can and be free of welds.

The can wall will have a cross-sectional thickness of about 0.6-1.5 mm, for example, about 1.1 mm. The can is made of pressed steel in one or more embodiments.

In further aspects, a filter cartridge is provided including a housing, as variously characterized herein, and a filter element operably mounted in the interior volume of the can/housing.

The filter element can be non-removably mounted in the housing.

The filter element can be removable and replaceable in the housing.

The cartridge can be constructed and arranged to have a burst pressure of at least 1700 psig.

In further aspects, a filter assembly is provided. The filter assembly includes a filter head having a threaded connection portion and a filter cartridge, as variously characterized herein, threadably attached by the interface ring to the threaded connection portion.

A method of filtering is provided. The method includes providing a filter assembly including a filter head and filter cartridge having a housing; the assembly includes an inlet arrangement, outlet arrangement, and filter media; directing fluid into the housing through the inlet arrangement, filtering the fluid by directing the fluid through the media, and directing the fluid out of the housing through the outlet arrangement; and wherein the burst pressure of the filter housing is at least 1700 psig where the filter housing has a wall thickness of at least 1.1 mm.

The method can include providing a housing as variously characterized herein.

A method of making a housing for a filter element is provided. The method can include providing a can having a wall surrounding an interior volume and an open mouth surrounded by a rim. The can wall can have an inner wall surface in communication with the interior volume. The method includes pressing an interface ring into the interior volume of the can through the open mouth. The interface ring has a ring wall with first and second opposite ends, an outer ring surface, and an inner ring surface. The inner ring surface can be threaded, although other connection means are possible. The outer ring surface is against the inner wall of the can. The ring wall is angled between the first and second ends greater than one degree and less than 6 degrees. The method includes the step of pressing the rim of the can against the first end of the interface ring to fold the can against the interface ring.

The method can further include orienting a seal member on the folded rim of the can. In the method, the housing can be made to have any of the features as variously characterized herein.

It is noted that not all the specific features described herein need to be incorporated in an arrangement for the arrangement to have some selected advantage according to the present disclosure.

DETAILED DESCRIPTION

The Arrangement of FIGS. 1-8

Figure 1:
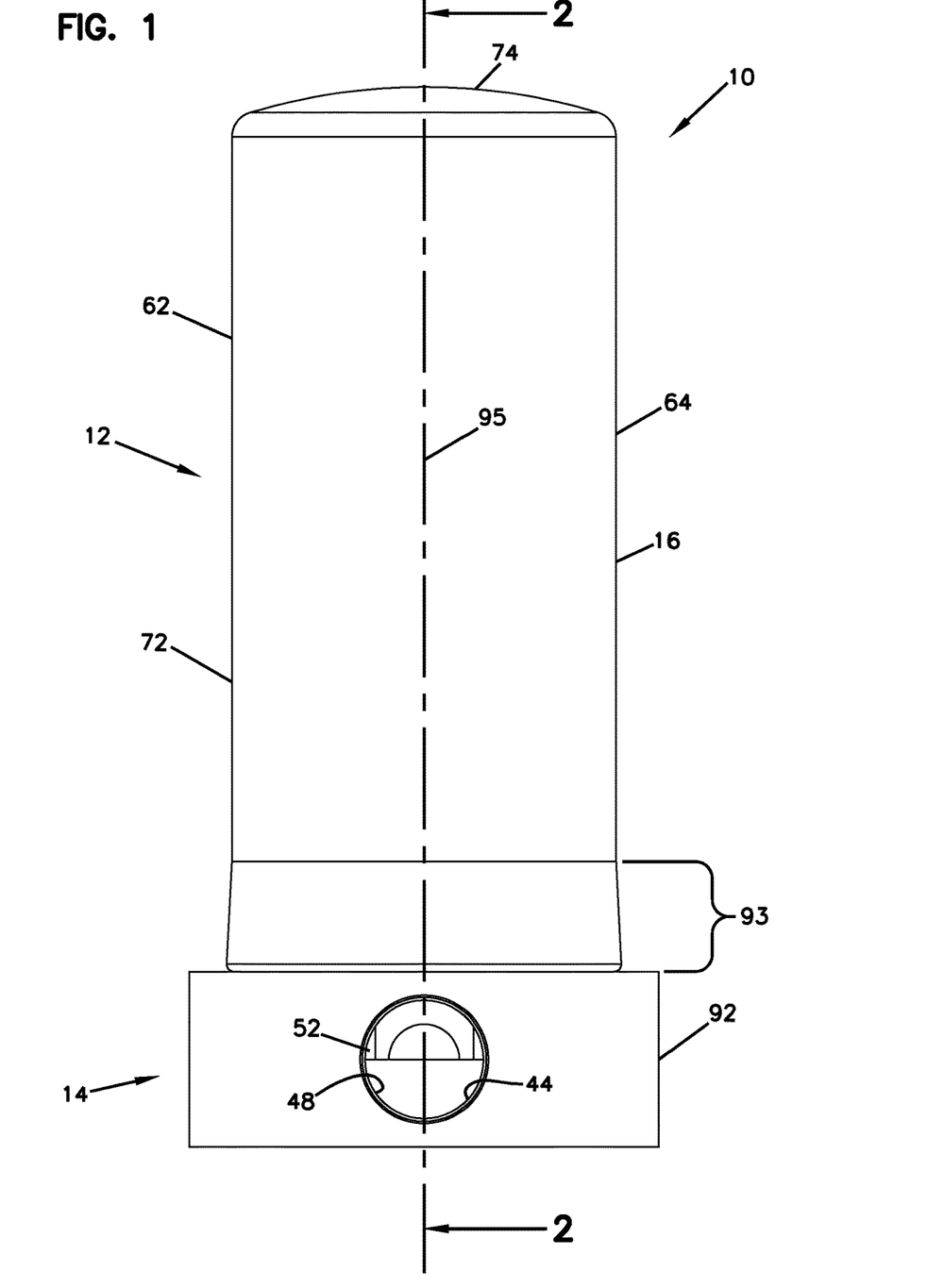
FIG. 1 is a front view of one embodiment of a filter assembly constructed in accordance with principles of this disclosure.

A filter assembly is illustrated in FIG. 1 at reference numeral 10. The filter assembly 10 includes a filter cartridge 12 releasably connected to a filter head 14. The filter cartridge 12 can be either a spin-on cartridge 12 or a bowl-cartridge filter 12.

The filter cartridge 12 includes a housing 16 and a filter element 18 held by the housing 16. In a spin-on cartridge 12, the element 18 is not removable and replaceable from the housing. Rather, when the cartridge 12 needs servicing, the entire housing and element is disposed of and replaced with a new cartridge 12 having a new housing and element. In a bowl-cartridge filter, the element 18 is removable and replaceable from the housing 16. When the cartridge 12 needs servicing, the old element 12 is removed and replaced with a new element 18. Both types of filter cartridges 12 in the form of a spin-on or bowl-cartridge filter are applicable to the principles of use herein.

The filter element 18 is illustrated herein as being a tubular section of filter media 20. In many preferred implementations, the media 20 can be in the form of a cylinder, in which the media 20 encloses an interior volume 22. The media 20 can be many different types of filter media, depending on what type of fluid is being filtered. For example, the media 20 can be pleated media. The media 20 can be cellulose, synthetic, or blends of cellulose and synthetic. The media 20 can be treated with fine fibers. The media 20 can also be multiple layers of media, including one or more layers of depth media. Many variations are possible.

The media 20 has opposite first and second ends 24, 26. In the embodiment shown, the first end 24 is secured to a first end cap 28. The first end cap 28 is closed and is not in communication with the interior volume 22.

Figure 2:
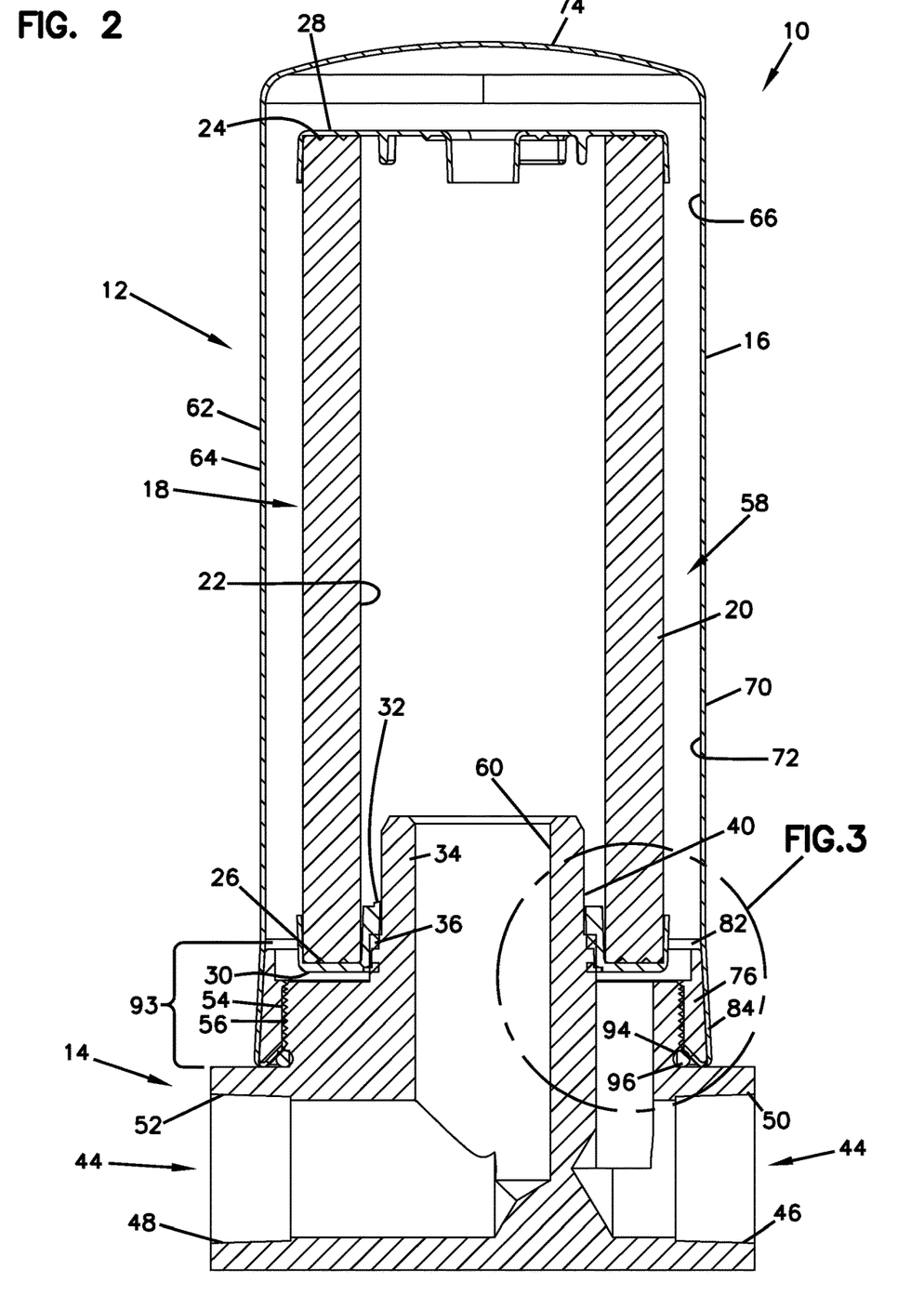
FIG. 2 is a cross-sectional view of the filter assembly of FIG. 1, the cross-section being taken along the line 2-2 of FIG. 1.

The second end 26 is secured to a second end cap 30. The second end cap 30 is shown as being an open end cap that is in communication with the interior volume 22. In FIG. 2, an opening 32 of the second end cap 30 receives a spud 34 from the filter head 14, which allows the spud 34 to project within the interior volume 22 and be surrounded by the media 20. A seal member 36 is between the second end cap 30 and the spud 34 to form a seal between and against the second end cap 30 and an outer surface 40 of the spud 34.

The filter head 14 includes a base 42 defining flow arrangements 44. A first flow arrangement is at 46, while a second flow arrangement is at 48. Depending on the desired flow of fluid through the filter element 18, the first flow arrangement 46 can be either an inlet or an outlet, and the second flow arrangement 48 can be either an outlet or an inlet. In a forward flow system, in which flow through the filter element is desired to flow from outside of the media 20 to the interior volume 22, the first flow arrangement 46 will be an inlet arrangement 50, while the second flow arrangement 48 will be an outlet arrangement 52. It should be understood that in reverse-flow conditions, the second flow arrangement 48 will be inlet arrangement, while the first flow arrangement 46 will be outlet arrangement.

The base 42 includes an outer wall 54. The outer wall 54 is constructed and arranged to releasably attach to the filter cartridge 12. In this embodiment, the outer wall 54 includes threads 56.

In operation, fluid to be filtered, when a forward flow system is set up, will be directed to the filter head 14 through the inlet arrangement 50. From there, the fluid will enter the unfiltered fluid volume 58, which is between the housing 16 and the outer periphery of the media 20. The fluid will then flow through the media 20 and into the interior volume 22. The media 20 will filter or remove at least some impurities from the fluid. The filtered fluid in the interior volume 22 will then exit the filter cartridge by flowing into the aperture 60 of the spud 34 and into the outlet arrangement 52. The filtered fluid will then exit the filter head 14.

Figure 4:
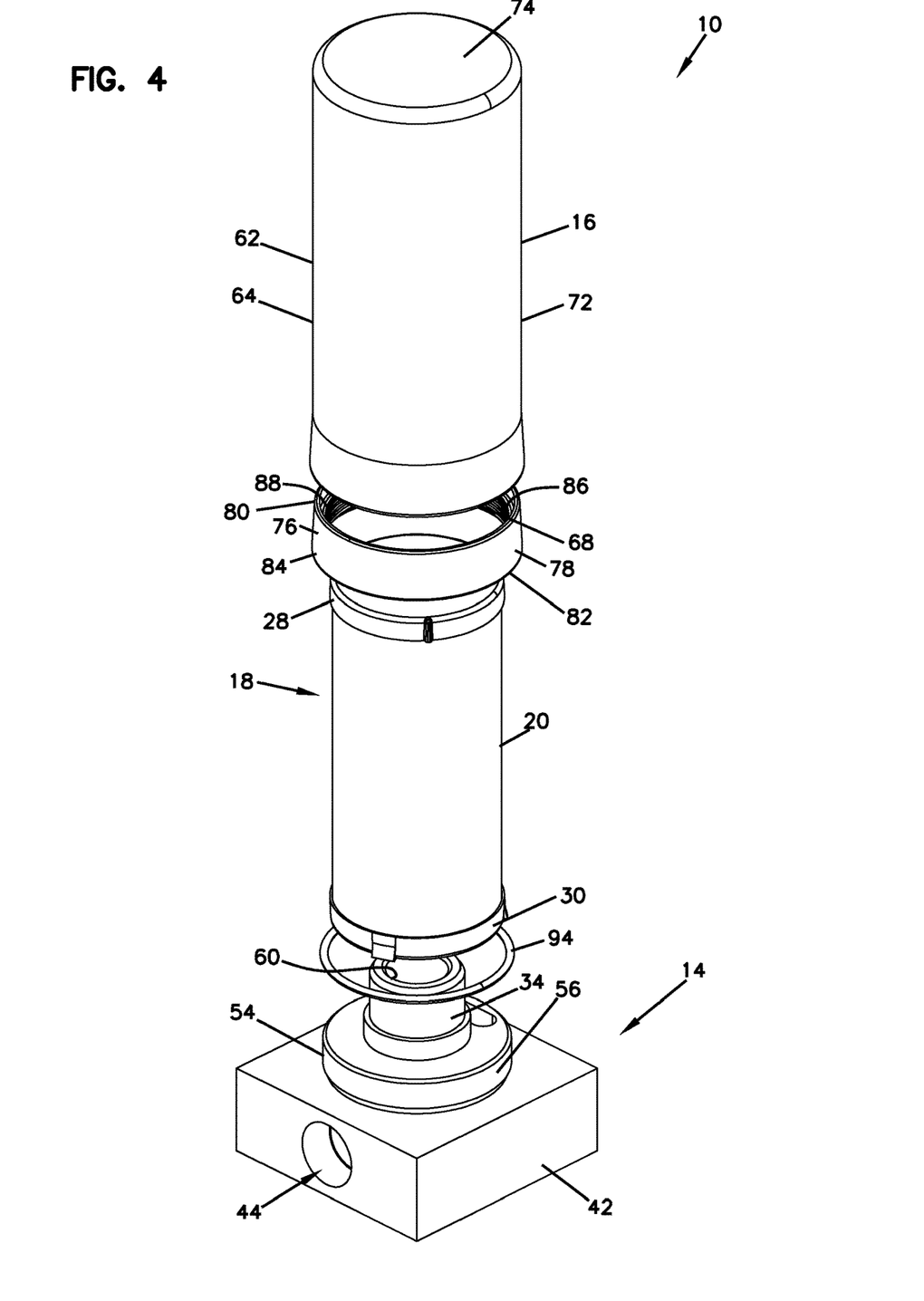
FIG. 4 is an exploded, perspective view of the filter assembly of FIG. 1.

In accordance with principles of this disclosure, the housing 16 includes a can 62. The can 62 includes a wall 64 surrounding an interior volume 66 and an open mouth 68 (FIG. 4). The can wall 64 has an inner wall surface 70 and an opposite outer wall surface 72. The inner wall surface 70 is in communication with the interior volume 66 of the can 62.

In the example embodiment shown, the can 62 has a closed end 74 opposite of the mouth 68. The closed end 74 is illustrated as dome-shaped, but it can also be flat.

In many preferred embodiments, the can 62 will be made of metal, such as pressed steel.

In other embodiments, the can 62 can be made from spun or press formed metal. Metals that can be spun or pressed include aluminum and alloys, including 1100, 2024, 3002, 3003, 5052, 6061; cold/hot rolled Steel—galvanized; copper, brass, bronze & muntz metal; hastelloy; inconel; kovar; stainless steel: type 304(L), 316(L), 310, 321, 347; titanium; and niobium.

The wall 64 of the can 62 will have a cross-sectional thickness of at least 0.7 mm and not greater than 2.5 mm, for example about 0.6-1.5 mm; and in some example embodiments about 1.1 mm. For wall thicknesses of about 1.1 mm, the burst pressure will be at least 1700 psig by splitting longitudinally along a length of the can wall 64. For wall thicknesses greater than 1.1 mm, it is expected that there would be a burst pressure higher than 1700 psig; for wall thicknesses less than 1.1 mm, it is expected that there would be a burst pressure less than 1700 psig.

The housing 16 further includes an interface ring 76. The interface ring 76 can be secured to the can 62 adjacent to the open mouth 68.

The interface ring 76 comprises a ring wall 78 with first and second opposite ends 80, 82. The ring wall 78 has an outer ring surface 84 and an inner ring surface 86 between the first end 80 and second end 82.

In this embodiment, the inner ring surface 86 includes a connection mechanism for releasably connecting the housing 16 to the filter head 14. In the example shown, the inner ring surface 86 has threads 88 for releasably attaching to the threads 56 of the filter head 14. Other embodiments are possible. For example, instead of having a threaded connection, the connection mechanism could be a bayonet fitting or the like.

In the embodiment shown, the outer ring surface 84 is against the inner wall surface 70 of the can 62. As explained further, there are no additional seal members, adhesive, or other structure or materials between the outer ring surface 84 and the inner wall surface 70 the can 62.

Figure 3:
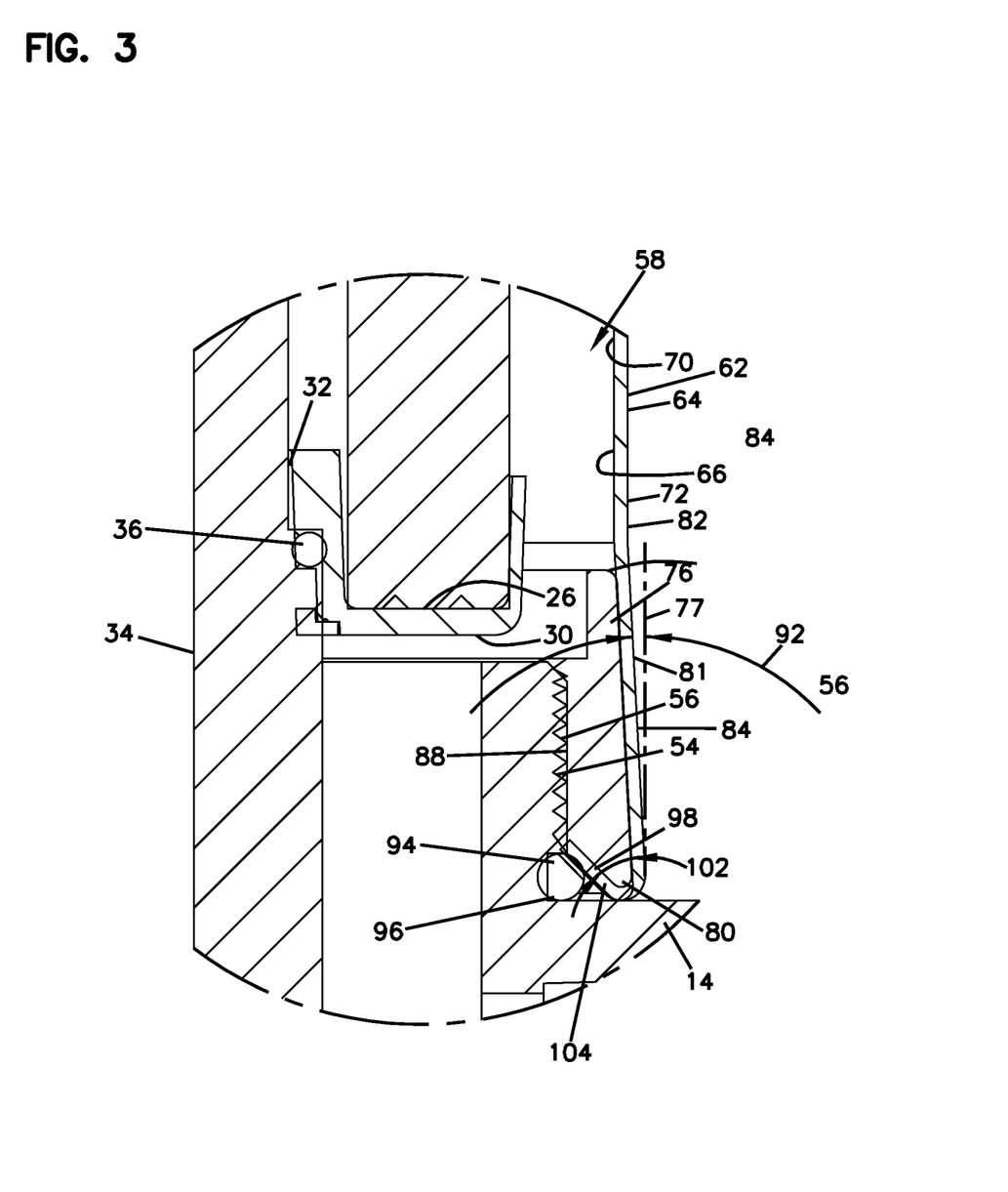
FIG. 3 is an enlarged cross-sectional view of a portion of the filter assembly of FIG. 2.

The ring wall 78 is angled at a non-zero and non-perpendicular angle between a line 77 parallel to a central axis 79 (FIG. 5) of the interface ring 76 and a portion 81 of the outer ring surface 84 between first end 80 and second end 82. This angle is shown in FIG. 3 at reference numeral 92. The angle 92 is preferably greater than one degree and less than 6 degrees.

By having the ring wall 78 angled at angle 92 when the interface ring 76 is inserted into the can 62, the can 62 will be stretched at stretched section 93, adjacent to the mouth 68. The stretched section 93 results in strengthening the can 62. Although no particular theory is asserted, it could be that stretching the can 62 is a form of work hardening, to increase the strength. The result is that the failure point of the housing can be along the can at the hoop stress point; that is, the filter cartridge 12 can split longitudinally along the can wall 64 in a direction between the closed end 74 and the mouth 68, shown schematically in FIG. 1 at 95. When a filter splits longitudinally down the length of the can wall 64, it means the total yield strength of the raw materials of the filter can has been achieved. This is contrasted with a failure resulting from plastic deformation of the can 62, for example, when the can 62 uncurls from the interface ring 76.

The angle 92 is selected to result in having the wall 64 of the can stretched to increase the strength but not to the extent that the wall 64 of the can weakens.

In one or more embodiments, the ring wall 78 is angled at angle 92 less than 5 degrees.

In one or more embodiments, there have been advantages from having the ring wall 78 be angled at angle 92 at least 1.5 degrees.

In one or more embodiments, the ring wall 78 has advantages when angled at angle 92 less than 4 degrees.

In one or more embodiments, advantages result when the ring wall 78 is angled at angle 92 between 1.5 degrees and 4 degrees.

The ring wall 78 has a cross-sectional thickness of at least 2 mm; in some embodiments, 3-10 mm, for example 6-9 mm, and in preferred implementations, not greater than 8 mm. The thicker the ring wall 78, the smaller the filter element that can be installed and the more expensive it is to manufacture.

The housing 16 includes a seal member 94. The seal member 94 forms a seal 96 with the filter head 14, when the housing 16 is operably connected to the filter head 14.

The seal member 94 is adjacent to the open mouth 68 of the housing 16. In FIG. 2, it can be seen how the seal member 94 is formed between and against the housing 16 and the base 42 of the filter head 14. The seal member 94 can be a gasket, or o-ring, or other similar constructions. The seal member 94 may be made of a rubber-like material, although other materials are possible.

The interface ring 76, in preferred embodiments, has a beveled surface 98. The beveled surface 98 can extend from the first end 80 of the interface ring 76 at the outer ring surface 84 and extend to the inner ring surface 86.

Attention is directed to FIG. 3. The beveled surface 98 is shown at an angle 102. The angle 102 is for helping to keep the can 62 secured to the interface ring 76. The angle 102 of the beveled surface 98 is preferably at least 40 degrees.

In one or more embodiments, the beveled surface 98 has angle 102 that is no greater than 70 degrees.

In one or more embodiments, the angle 102 of the beveled surface 98 will be between 40 degrees and 70 degrees.

Still in reference to FIG. 3, the can 62 has a section 104 that is folded over the interface ring 76 at the open mouth 68. This folded over section 104 forms a J-seam 105 (FIG. 8) with the interface ring 76.

In preferred implementations, the can 62 has section 104 folded over and against the beveled surface 98. As can be seen in FIG. 3, in this embodiment, the seal member 94 is between and against the section 104 and the filter head 14.

In the example shown, the seal member 94 is along the outer wall 54 of the head 14 and adjacent to the threads 56. The seal member 94 forms seal 96 between and against the folded section 104 of the can 62 and the outer wall 54 of the filter head 14.

It should be noted that the housing 16 and the filter cartridge 12 is seal member-free between the interface ring 76 and the can wall 64.

Preferably, the outer ring surface 84 is against the inner wall surface 70 of the can 62 in direct contact and attached without any additional attachment mechanism, such as adhesive, welding, etc. Preferably, the area between the outer ring surface 84 and the inner wall surface 70 of the can 62 is adhesive-free.

In one or more embodiments, the interface ring 76 is secured to the can 62 free of any welds.

The interface ring 76, once inserted in the can 62 to stretch the can 62, will be self-supporting within the can 62; that is, there is nothing else in the can 62 that is needed to hold the interface ring 76 in place. This can be accomplished by an interference fit between the outer ring surface 84 and the inner wall surface 70 of the can. As used herein an interference fit, also known as a press fit or friction fit, means a fastening between two parts which is achieved by friction after the parts are pushed together, rather than by any other means of fastening.

In one or more example embodiments, the can wall 64 is free of any shoulders, ridges, or radially inward extending bumps at the second end 82 of the ring wall 78. None are needed to support the interface ring 76. There can be many variations.

In preferred embodiments, the can wall 64 is completely shoulder-free.

The folded section 104 is preferably the only fold that is in the can 62. In one or more embodiments, the can 62 has no more than a single fold, being depicted at folded section 104.

Methods of operating the filter assembly 10 should be apparent from the above. In one method, there is a step of providing a filter assembly 10 with an inlet arrangement, outlet arrangement, and filter media. For example, the filter assembly 10 can be provided including cartridge 12 with housing 16 and filter head 14. The filter head 14 has inlet arrangement 50, outlet arrangement 52, and filter media 20.

The method of filtering can include the step of directing fluid into the housing 16 through the inlet arrangement 50; filtering the fluid by directing the fluid through the media 20; and then directing the fluid out of the housing 16 through the outlet arrangement 52 of the filter head 14.

The method of filtering will include using filter housing 16, as variously characterized above, in which the burst pressure of the filter housing 16 is at least 1700 psig.

The filter assembly 10 can be made using only press tools, which has advantages in that the assembly 10 does not require sophisticated equipment and can be assembled almost anywhere in the world. Example methods of making housing 16 for a filter cartridge 12 is shown in FIGS. 5-8.

In one example method, there is a step of providing can 62 having wall 64 surrounding interior volume 66 and an open mouth 68. The open mouth 68 is surrounded a rim 106. The can wall 64 has inner wall surface 70 in communication with the interior volume 66.

Figure 5:
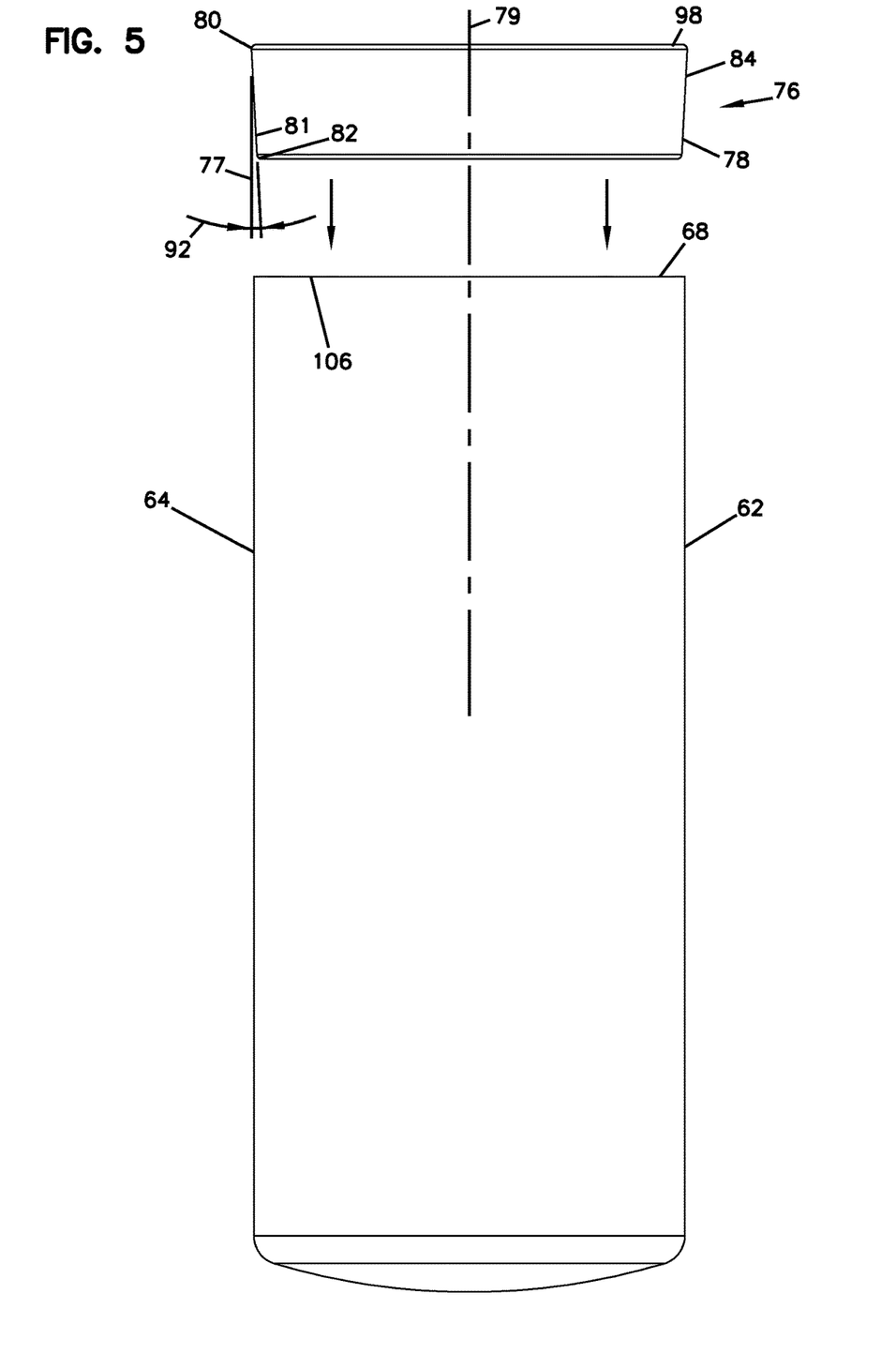
FIG. 5 is a cross-sectional view one step in making the housing for the filter assembly of FIGS. 1-4.

FIG. 5 shows the can 62 and interface ring 76 prior to inserting the interface ring 76. The can 62 is cylindrical at the mouth 68, and it is not stretched prior to insertion of the interface ring 76.

The method can include pressing interface ring 76 into the interior volume 66 of the can 62 through the open mouth 68. The interface ring 76 has ring wall 78 with first and second opposite ends 80, 82, an outer ring surface 84, and inner ring surface 86. The inner ring surface 86 is threaded at 88. The outer ring surface 84 is against the inner wall 70 of the can 62. The ring wall 78 is angled at angle 92 which is greater than 1 degree and less than 6 degrees.

Figure 6:
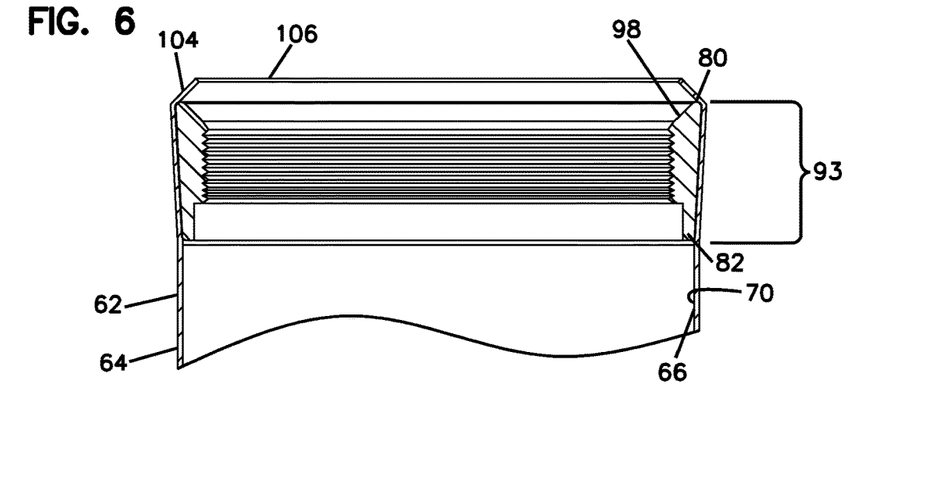
FIG. 6 is a cross-sectional view of a portion of the filter housing in another step of making the housing used in the assembly of FIG. 1.

FIG. 6 shows the interface ring 76 inserted through the mouth 68 of the can 62, which stretches the wall 64 of the can 62 to form stretched section 93. The stretched section 93 will be stretched from the mouth 68 along the can call 64 for the length of the interface ring 76 at the same angle 92 (FIG. 3) of the interface ring 76 between the first and second ends 80, 82.

The method includes a step of pressing the rim 106 of the can 62 against the first end 80 of the interface ring 76 to fold the can 62 against the interface ring 76.

The step of pressing the rim 106 against the first end 80 of the interface ring 76 includes, as shown in FIG. 6, bending the section 104 of the can 62 first to a 45 degree angle.

Figure 7:
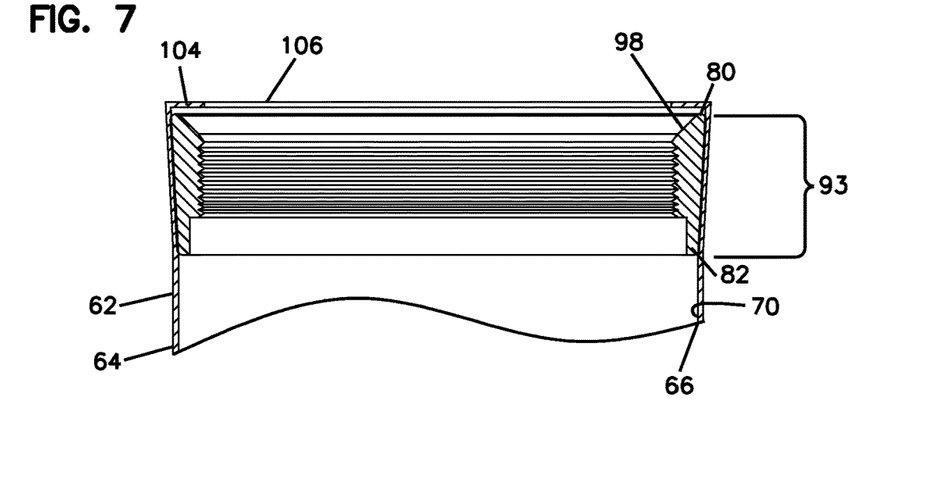
FIG. 7 is a cross-sectional view of the portion of the housing of FIG. 6 in another step of making the housing used in the assembly of FIG. 1.

In FIG. 7, the section 104 of the can 62 is bent to a 90 degree angle.

Figure 8:
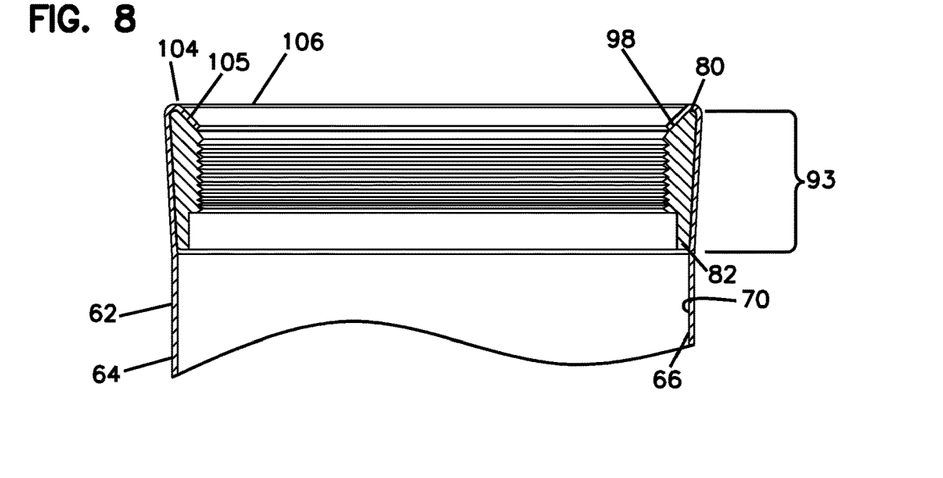
FIG. 8 is a cross-sectional view of the portion of the housing of FIGS. 6 and 7 in another step of making the housing used in the assembly of FIG. 1.

FIG. 8 illustrates the section 104 of the can 62 being bent to conform to the first end 80 of the interface ring 76.

In preferred implementations, the first end 80 will include the beveled surface 98, so that the section 104 is pressed against the beveled surface 98.

The method of making can include adding no more than a single fold of the can 62, the fold being at section 104 against the first end 80 of the interface ring 76.

The method can include orienting seal member 94 on the folded rim 106 along section 104 of the can 62.

The housing 16 can be made to have any of the various features as characterized above including, for example: the housing being seal member-free between the interface ring and can wall; the interface ring being self-supporting within the can; the ring wall angle 92 being less than 5 degrees; the ring wall angle 92 being at least 1.5 degrees; the ring wall angle 92 being less than 4 degrees; the ring wall angle 92 being angled between 1.5 degrees and 4 degrees; the interface ring being secured to the can without the use of any welds; the can being made of metal, such as pressed steel; and the can wall having a cross sectional thickness of 0.6-1.5 mm, for example, about 1.1 mm.

Examples

Figure 9:
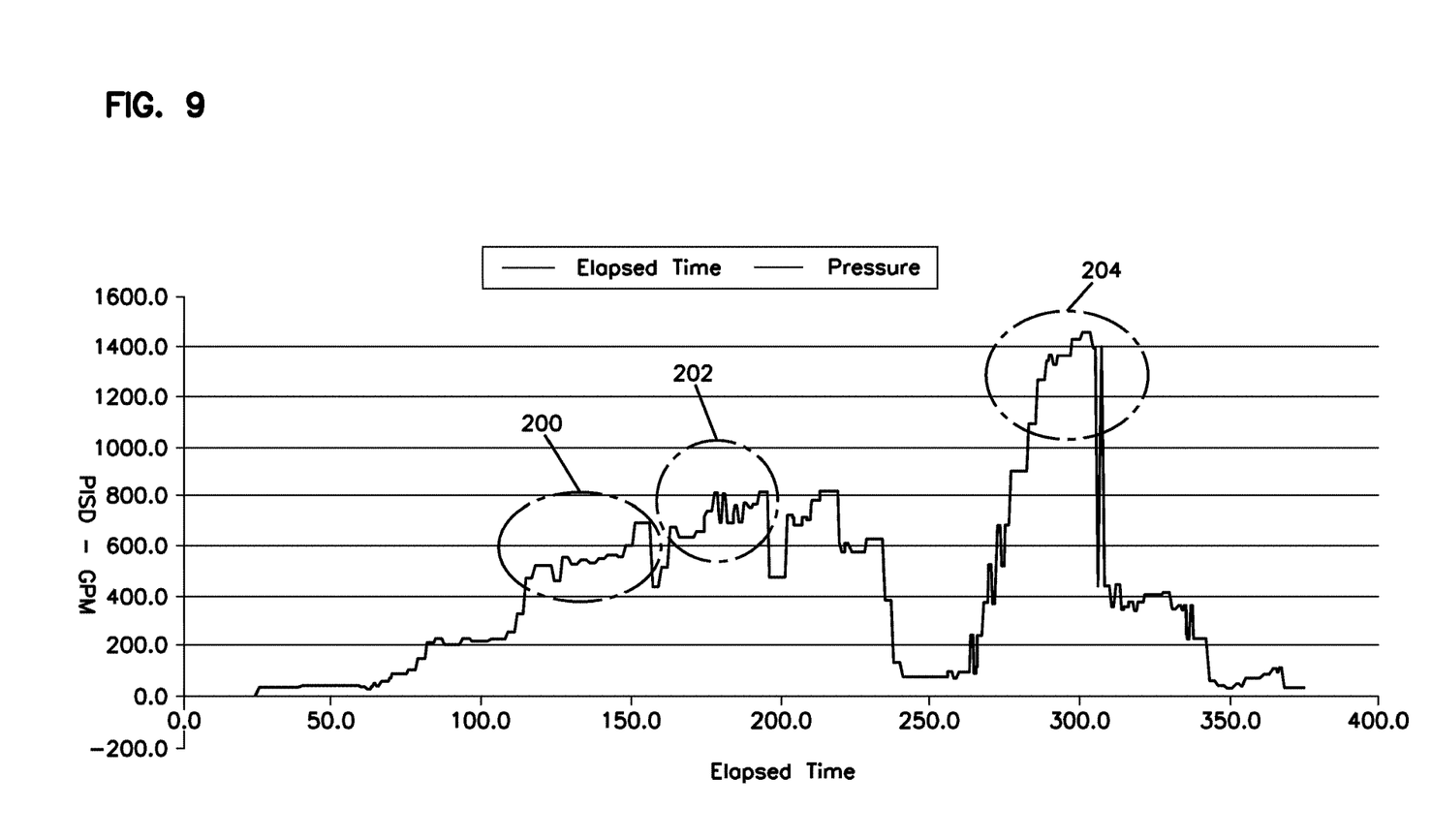
FIG. 9 is a graph showing results of testing including a can, interface ring secured to the can, and the wall of the interface ring being angled between first and second ends at 8.5°.

Three different static burst tests using oil as the pressure fluid were conducted on filters with a can 62 having a J seam 105 including a wall of the interface ring 76 being angled between first end 80 and second end 82 at 8.5° (abbreviated herein as "the 8.5° can") with the results shown in FIG. 9. Each filter used a can wall having a thickness of about 1.1 mm and made from pressed steel. All three tests had very similar results. For example, in all three tests: seal integrity was broken by 500 to 600 psig; almost complete seal failure was observed by 800 psig; and J seam uncurling and interface ring shifting was observed at 1,400 to 1,500 psig. Failures due to can (housing) wall splitting were not observed in any of the tests. Failure by means other than can wall splitting suggests the total yield strength of the raw materials of the can wall was not achieved—rather, failure occurred because of leaking followed by the lip of the can uncurling from the interface ring.

FIG. 9 shows a graph showing results of a burst tests using the filter housing described above having the 8.5° can. In the FIG. 9 graph, psid=psig because the differential pressures were the internal housing pressure and atmosphere. Using oil as the pressure median the first circle 200 on the static bust test pressure curve indicates where the seal starts to fail (500-600 psig); the second circle 202 shows the pressure (800 psig) that the seal fails almost completely; and the third circle 204 highlights the pressure, about 1,500 psig, that the J Seam uncurls resulting in complete product failure.

Figure 11:
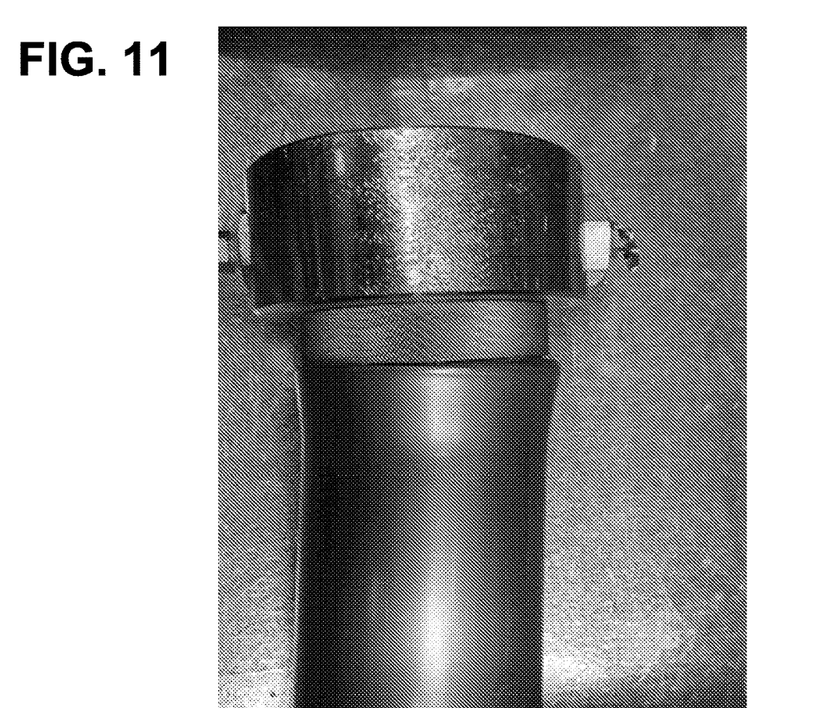
FIG. 11 is a photograph of a fixture for a static burst test with a can having a wall of the interface ring being angled between first and second ends at 8.5°.
Figure 12:
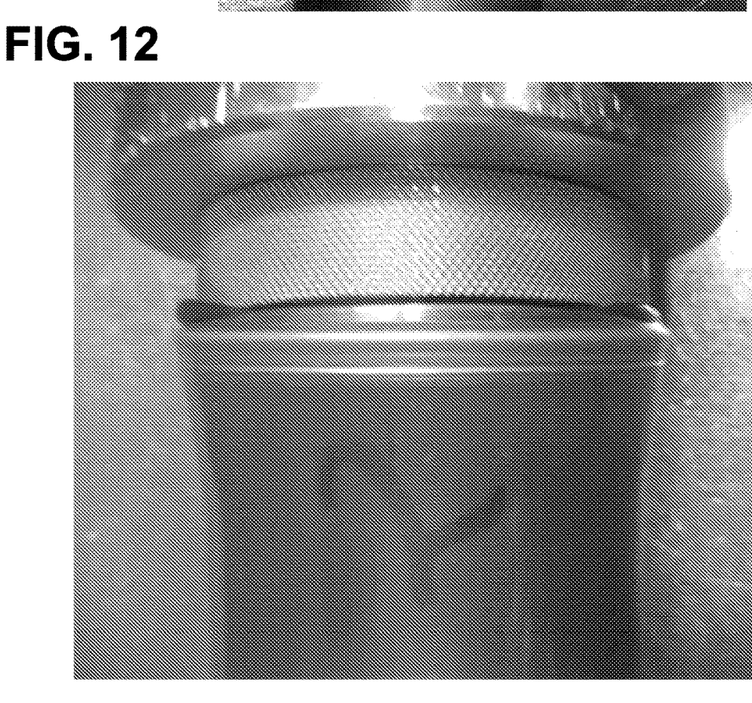
FIG. 12 is a photograph of the can of FIG. 11 after the static burst test.
Figure 13:
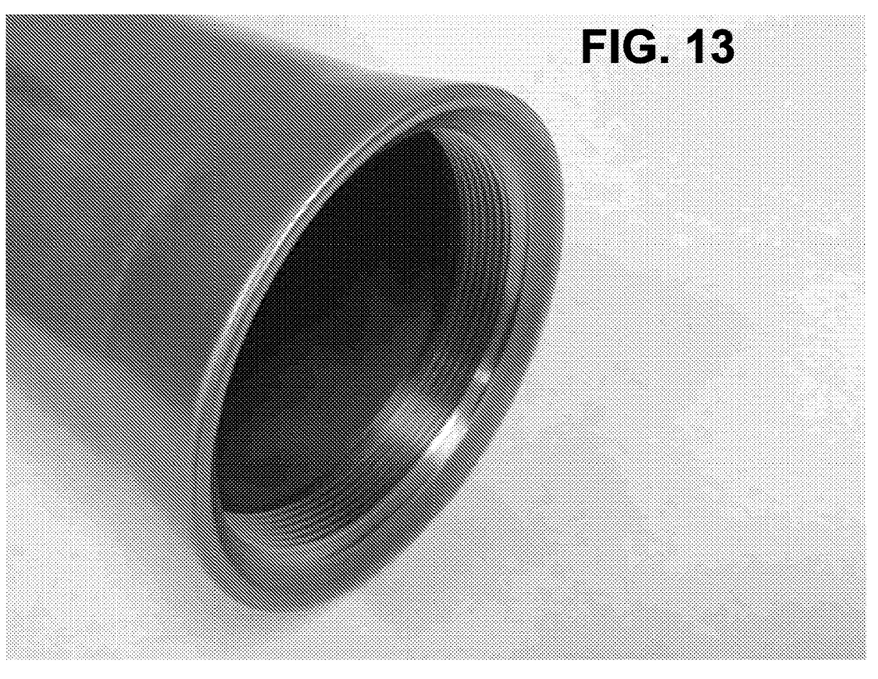
FIG. 13 is a photograph of a can with an 8.5° interface ring in a normal, intact position, before burst testing.
Figure 14:
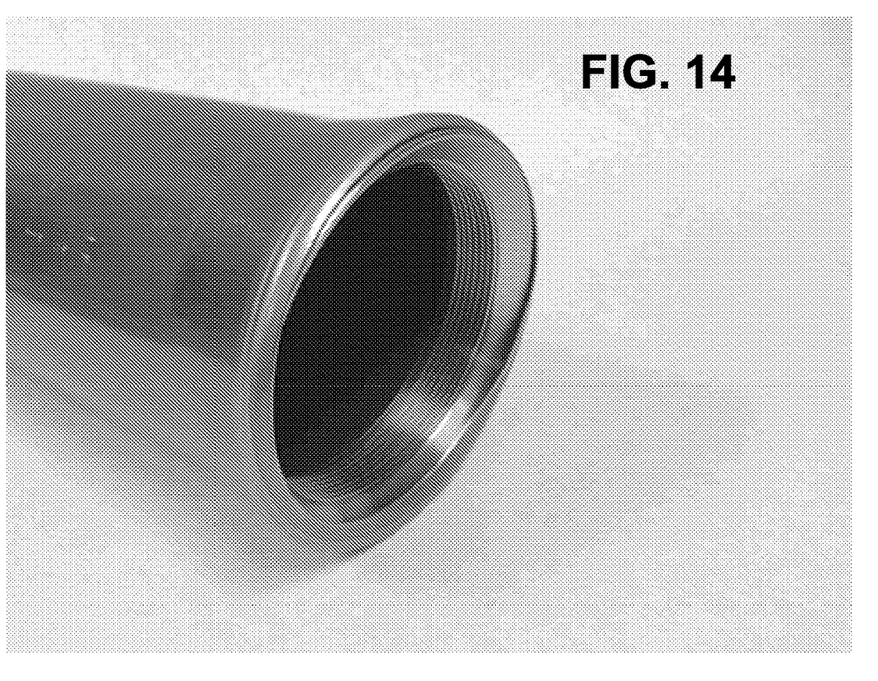
FIG. 14 is a photograph of the can of FIG. 13 after burst testing.

FIG. 11 is a photograph of a fixture for a static burst test with an 8.5° can. The can in FIG. 11 is shown before the burst test. FIG. 12 is a photo of the can of FIG. 11 after the burst test. In FIG. 12, failure can be seen in the form of the J-seam uncurling and the interface ring extruding from the can.

Figure 15:
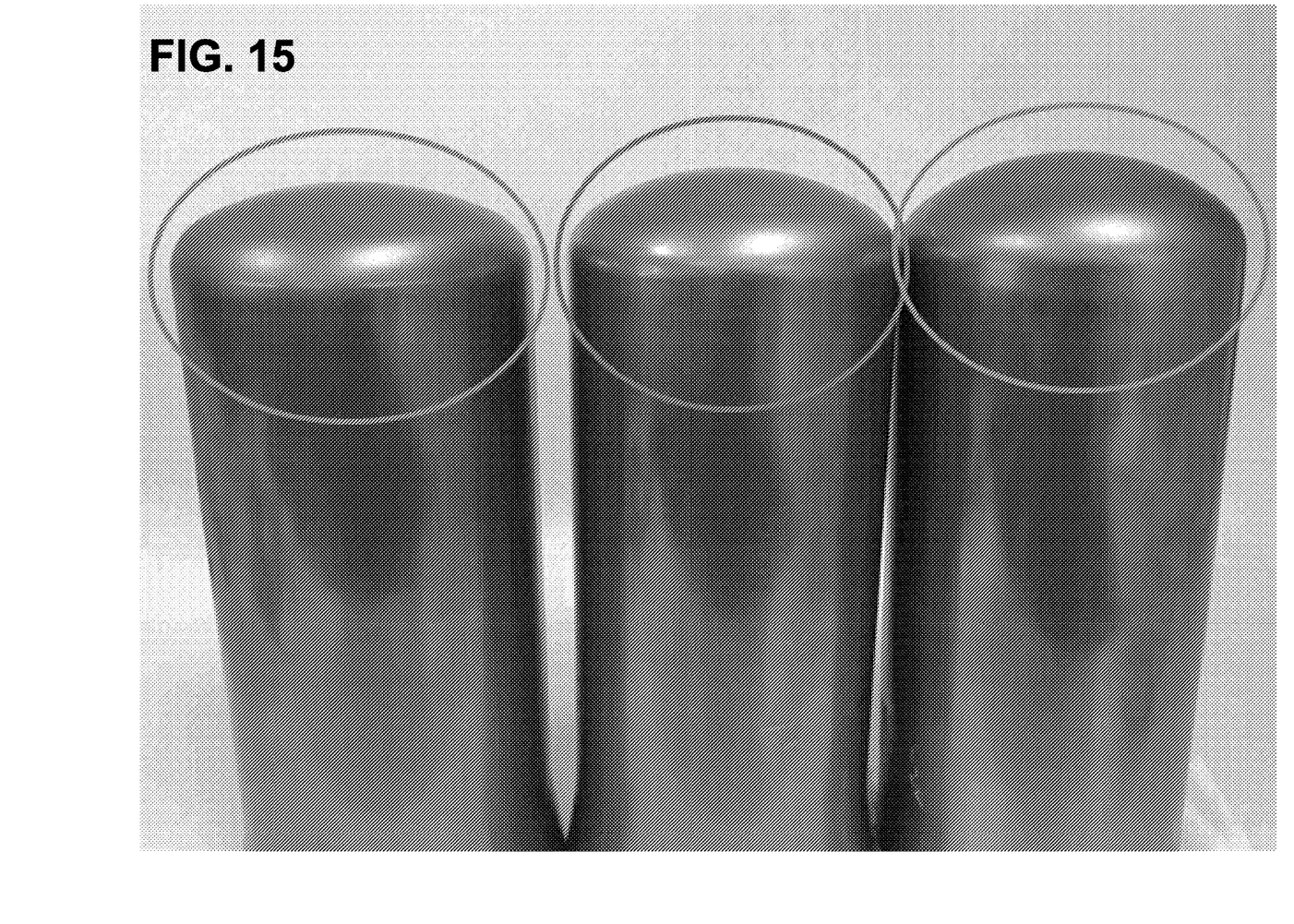
FIG. 15 is a photograph of 3 cans after burst testing.

The domed end of tested metal housings were observed. See FIG. 15. The maximum deformation observed with the 8.5 degree can was compared to the domed end of a 3 degree can. The 3° can was a filter housing made identical to the 8.5° can (identical materials and wall thickness), with the only difference being the interface ring 76 is angled between first end 80 and second end 82 at 3° instead of 8.5°. In FIG. 15, the left-most can shows the domed end of the can before the static burst test. The middle can shows an 8.5° can after the burst test, and the right can shows a 3° can after the burst test. The deformation in the domed end that was observed with a static burst test on the 3 degree can was greater than what was observed with the 8.5 degree can. This suggests that the internal metal housing pressure was much greater with the 3 degree ring versus the 8.5 degree ring.

Figure 16:
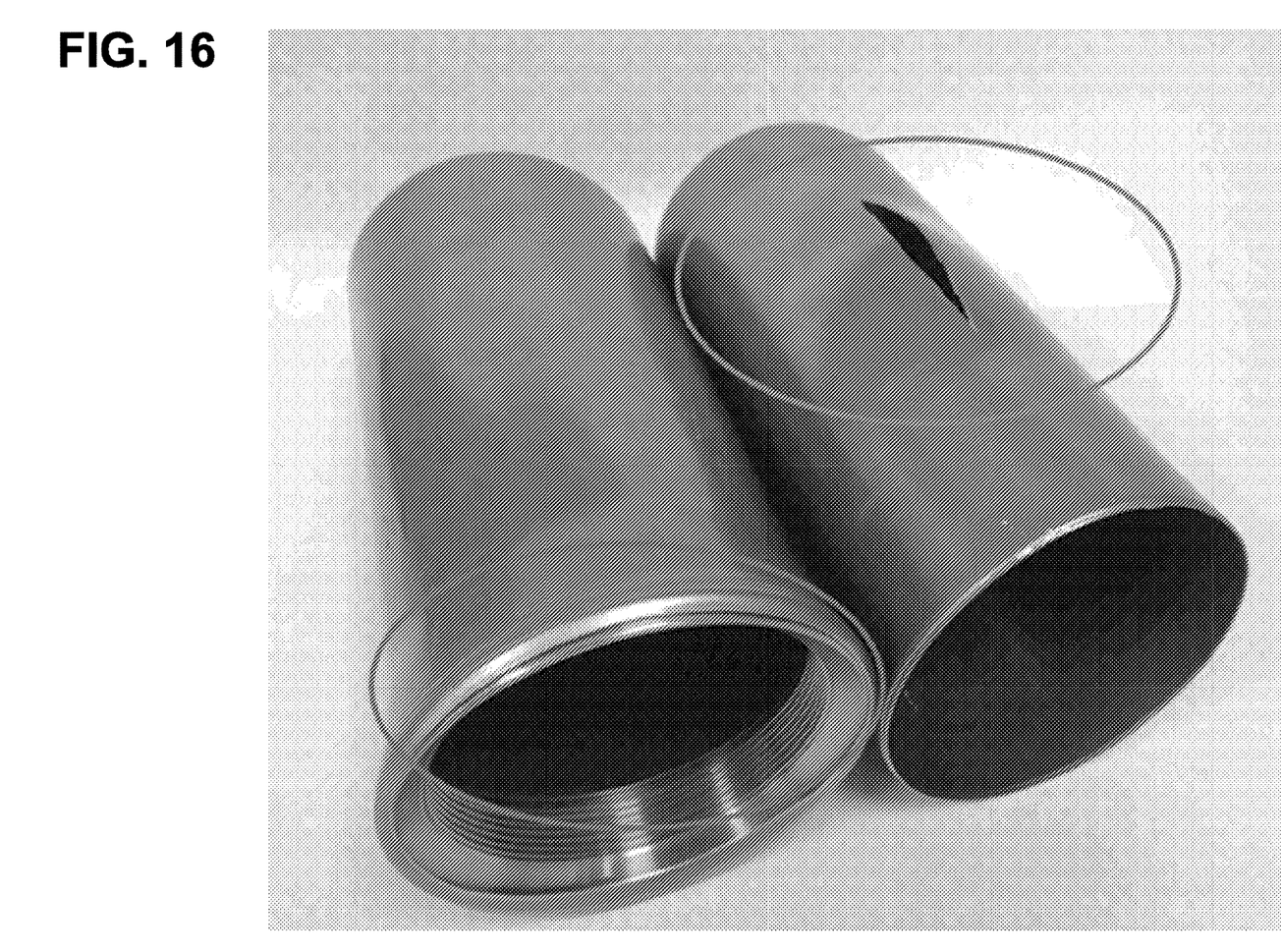
FIG. 16 is a photograph of 2 cans after burst testing.

FIG. 16 is a photograph comprising the 8.5° can (left can) after the burst test to the 3° can (right can) after the burst test. The 8.5° can shows catastrophic failure due to an extruded interface ring. The 3° can shows failure by a longitudinal split along the can wall. The J seam failure for both the cans was about 1500 psig, and the internal pressure to form a longitudinal split along the can wall for this can material and wall thickness was about 1700 psig.

Figure 10:
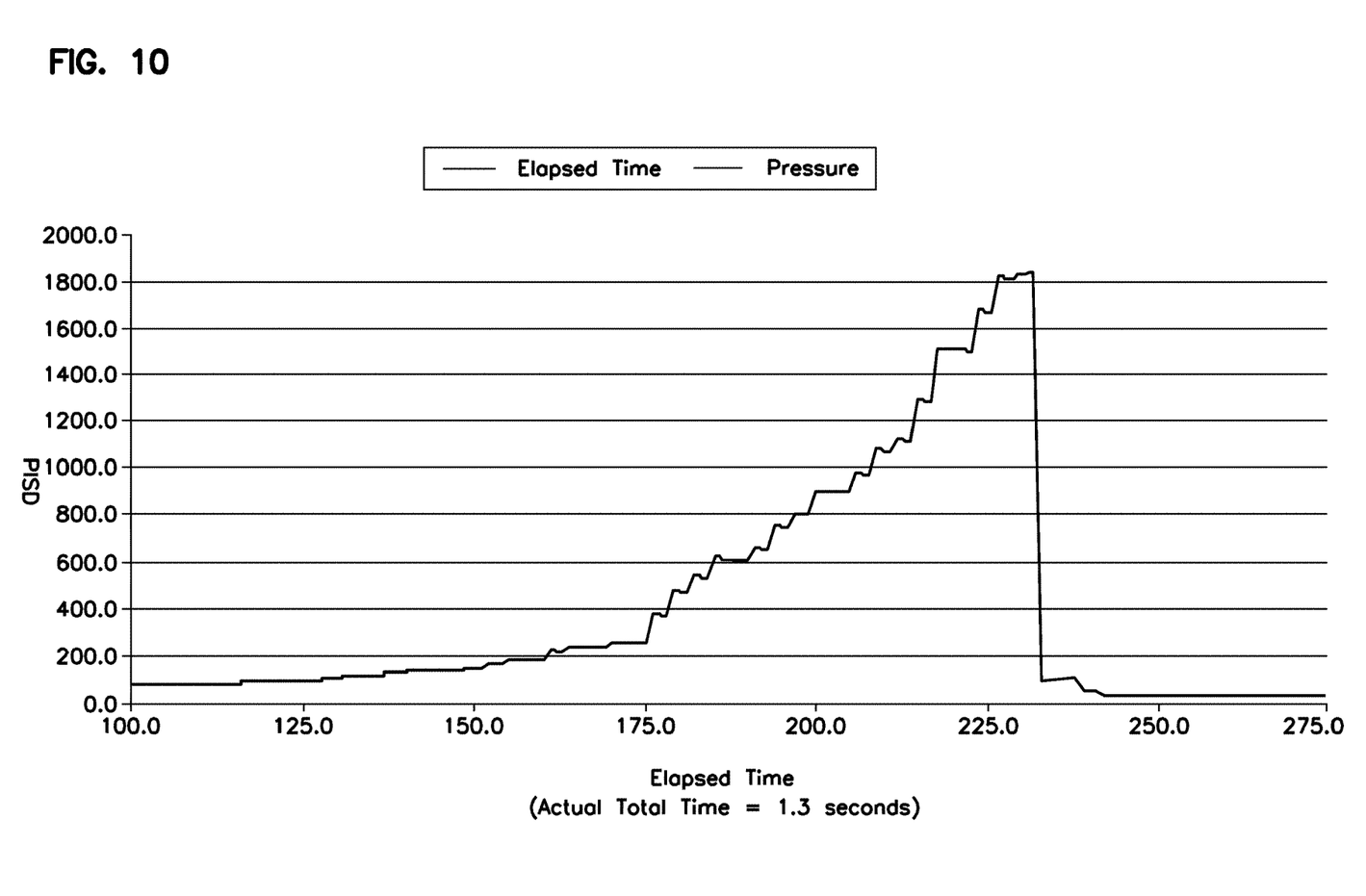
FIG. 10 is a graph showing results of testing with a filter housing made in accordance with principles of this disclosure.

FIG. 10 is a graph showing burst test results of a filter made according to principles of this disclosure, having a 3 degree press fit interface ring and a can wall having a thickness of about 1.1 mm and made from pressed steel. There was J seam uncurling at about 1500 psig, and a failure by longitudinal split along the can wall over 1700 psig, indeed in excess of 1800 psig.

In comparing the 8.5 degree interface ring versus the 3 degree interface ring of the present disclosure, the following observations can be made: Using the 3 degree press fit ring of the present disclosure, there was no seal leakage until failure due to the J-seam uncurling at around 1,500 psig (same as the 8.5 degree design). The 3 degree press fit interface ring of the present disclosure burst via longitudinal split along the housing at an internal pressure of greater than 1,700 psig, indeed greater than 1800 psig. The 8.5° cans leaked at internal pressures starting at 500 psig and were not able to maintain an internal pressure great enough to achieve a burst metal housing via longitudinal split.

Evidence of the ability to achieve a greater maintained internal pressure for a product constructed using the 3 degree press fit interface ring of the present disclosure was demonstrated through the greater extension of the closed dome end and burst metal failures. These observations show a leak free design until failure better at a 3 degree press fit design when compare to the 8.5 degree press fit design.

The above represents example principles. Many embodiments can be made applying these principles.

What is claimed is:

1. A housing for a filter element; the housing comprising:
   (a) a can having a wall surrounding an interior volume and an open mouth; the can wall having an inner wall surface in communication with the interior volume; and
   (b) an interface ring secured to the can adjacent to the open mouth;
      (i) the interface ring having a ring wall with first and second opposite ends, an outer ring surface, and an inner ring surface;
      (ii) the outer ring surface being against the inner wall of the can; and
      (iii) the ring wall being angled between the first and second ends greater than 1° and less than 6°.
2. A housing according to claim 1 further comprising:
   (a) a seal member at the open mouth to form a seal with a filter head, when the housing is secured to a filter head.
3. A housing according to claim 1 wherein:
   (a) the housing is seal-member free between the interface ring and the can wall.
4. A housing according to claim 1 wherein:
   (a) the interface ring is self-supporting within the can.
5. A housing according to claim 1 wherein:
   (a) the interface ring has a beveled surface from the first end at the outer ring surface and extending to the inner ring surface.
6. A housing according to claim 5 wherein:
   (a) the beveled surface has an angle of at least 40°.
7. A housing according to claim 5 wherein:
   (a) the beveled surface has an angle no greater than 70°.
8. A housing according to claim 1 wherein:
   (a) the can has a section folded over the interface ring at the open mouth.
9. A housing according to claim 5 wherein;
   (a) the can has a section folded over and against the beveled surface.
10. A housing according to claim 1 wherein:
    (a) the can has no more than a single fold.
11. A housing according to claim 2 wherein:
    (a) the interface ring has a beveled surface from the first end at the outer ring surface and extending to the inner ring surface;
    (b) the can has a section folded over and against the beveled surface; and
    (c) the seal member is against the folded section of the can.
12. A housing according to claim 1 wherein:
    (a) the can wall is shoulder-free.
13. A housing according to claim 1 wherein:
    (a) the ring wall is angled between the first and second ends between 1.5° and 4°.
14. A housing according to claim 1 wherein:
    (a) the can wall has a cross-sectional thickness of between 0.8 and 1.5 mm.
15. A housing according to claim 1 wherein:
    (a) the can is made of pressed steel.
16. A filter cartridge comprising:
    (a) a housing according to claim 1; and
    (b) a filter element operably mounted in the interior volume of the can.
17. A filter cartridge according to claim 16 wherein:
    (a) the housing is constructed and arranged to have a burst pressure of at least 1700 psig.
18. A method of making a housing for a filter cartridge; the method comprising:
    (a) providing a can having a wall surrounding an interior volume and an open mouth surrounded by a rim; the can wall having an inner wall surface in communication with the interior volume;
    (b) pressing an interface ring into the interior volume of the can through the open mouth;
       (i) the interface ring having a ring wall with first and second opposite ends, an outer ring surface, and an inner ring surface;
       (ii) the outer ring surface being against the inner wall of the can;
       (iii) the ring wall being angled between the first and second ends greater than 1° and less than 6°; and
    (c) pressing the rim of the can against the first end of the interface ring to fold the can against the interface ring.
19. A method according to claim 18 further comprising:
    (a) orienting a seal member on the folded rim of the can.

* * * * *

UNITED STATES PATENT AND TRADEMARK OFFICE
CERTIFICATE OF CORRECTION

| | | |
|---|---|---|
| PATENT NO. | : 10,512,859 B2 | Page 1 of 1 |
| APPLICATION NO. | : 15/532024 | |
| DATED | : December 24, 2019 | |
| INVENTOR(S) | : Philip Edward Johnson and Johnathan G. Parsons | |

It is certified that error appears in the above-identified patent and that said Letters Patent is hereby corrected as shown below:

In the Specification

Column 1, Line 8:
Delete "61/093,729" and insert --62/093,729--

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*